Oct. 26, 1948.                J. P. JOHNSON                 2,452,469
                                  SEAL
                           Filed May 22, 1945

INVENTOR.
JAMES P. JOHNSON
BY
Oberlin & Limbach
ATTORNEYS

Patented Oct. 26, 1948

2,452,469

UNITED STATES PATENT OFFICE 2,452,469

SEAL

James P. Johnson, Shaker Heights, Ohio

Application May 22, 1945, Serial No. 595,108

2 Claims. (Cl. 285—137)

This invention relates as indicated to seals and more especially to seals adapted particularly to be used in conjunction with machine parts which are maintained in contact with each other and are provided with aligned openings constituting a fluid passage in the machine. In assemblies of this character, the juxtaposed faces of the machine parts, even though accurately machined, never can be relied upon to fit closely enough to prevent seepage along such faces of the fluid contained in the passage so that some means must be provided for sealing such passage or more particularly the area of the juxtaposed faces of the machine parts around such passage.

Heretofore, it has been attempted to accomplish this result by the use of various non-metalic elements of various shapes and cross-sectional configuration. However, all such arrangements have been only partially successful in that however formed, these non-metallic gaskets have the tendency to deteriorate during use as by shrinkage or the like, especially when subjected to high temperatures and deteriorating fluids.

When the machine parts are such as to require repeated separation, i. e. repeated making and breaking of the seal, a further difficulty is encountered in that the normal deterioration of the gasket member is accelerated and furthermore, the use of cemented gaskets is so bothersome as to be virtually impractical.

It is a principal object of my invention to provide a seal of the character described which obviates all of the above enumerated deficiencies of the prior art.

Other objects of the invention will appear as the description proceeds.

To the accomplishment of the foregoing and related ends, said invention then comprises the features hereinafter fully described, and particularly pointed out in the claims, the following description and the annexed drawing setting forth in detail certain illustrative embodiments of the invention, these being indicative, however, of but a few of the various ways in which the principle of the invention may be employed.

In said annexed drawing—

Figure 1:
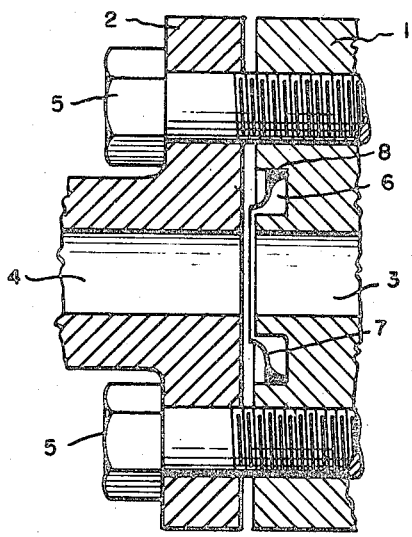
Fig. 1 is a fragmentary, sectional view of two machine parts provided with aligned openings forming a continuous passage therethrough and having associated therewith and around such passage a seal constructed in accordance with the principles of my invention.
Figure 2:
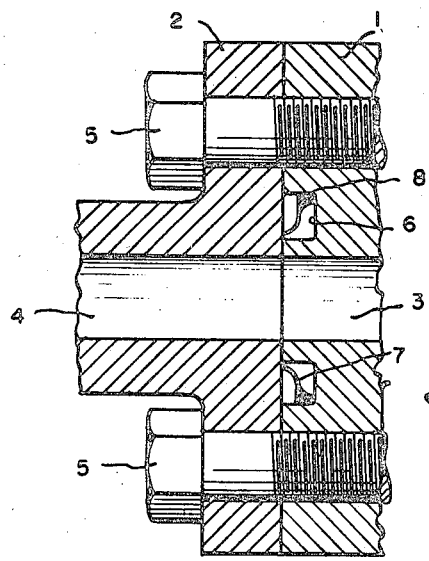
Fig. 2 is a sectional view similar to Fig. 1 but showing the machine parts in fully assemblied relation.
Figure 3:
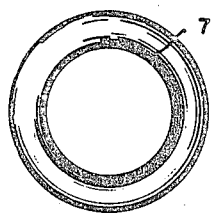
Fig. 3 is a side elevation view of the seal element shown in the previous figures.

Referring now more specifically to the drawing and more especially to Figs. 1 and 2, my invention is, as previously explained, adapted to be used in conjunction with machine parts such as 1 and 2 which are provided with openings 3 and 4 respectively, the same being in alignment when the machine parts are held in assembled relation by means of bolts 5, so as to constitute a continuous passage for fluid in the machine. A condition such as that illustrated in Fig. 1 is encountered in many instances in machine design, as for example in pumps and the like, where it is necessary to establish a fluid passage through two or more elements of the machine which, for one reason or another, must be capable of disassembly.

In accordance with the preferred embodiment of my invention, one of the machine elements such as 1 is provided with an annular groove 6 preferably concentric with the passage 3. The seal generally indicated at 7 is mounted in such annular groove 6 and as shown by the drawing, my improved seal comprises a metallic annulus having a generally S-shaped cross-section. The seal is preferably made of relatively stiff, spring-like material, such as high carbon steel, so as to be capable of repeated flexure without impairment of its ability to resume its initial shape. The seal is of an outside diameter preferably slightly less than the largest diameter of the annular groove 6 and is preferably cemented in such groove by depositing a material generally indicated at 8 which will be effective to hold the seal assembled with respect to the machine element with which it is employed. The function of the cement 8 is two-fold. First, it insures that the seal will always be held in the machine part with which it is employed so that it does not become lost when the parts are disassembled and will always be maintained in the proper concentric relation with respect to the passage 3. A second function of the cement 8 is that it assists in providing a perfect seal between the member 7 and the machine part with which it is associated although this latter function is of secondary importance since the engagement between the metallic annulus 7 and the machine part itself is usually sufficient to provide the necessary seal.

The material 8 may be any of the numerous available cements such as the organic resin and the like commonly employed in locations such as the one described.

The axial extent of the annulus 7 is at least slightly greater than the axial extent of the annular groove 6 in which it is mounted. Thus, when cemented or otherwise positioned and secured in the annular groove 6, the annulus 7 will project axially for a slight distance beyond the face of the machine part 1 when the machine part is in disassembled condition. When the machine parts are brought together as illustrated in Fig. 2 under the influence of clamping bolts or the like, such as those illustrated at 5, the annulus 7 is then deformed, thus insuring that both of its edges are forced into tight sealing engagement with the two machine parts. In the preferred embodiment of my invention, the unflexed form of the annulus 7 is such that its cross-section is substantially an ogee curve, i. e. the axial terminals thereof extend substantially normally to the planes of the opposed faces of the machine parts with which the seal comes into engagement. Then as the seal is flexed a maximum pressure in the axial direction will be exerted on the sharp edge of the seal. A seal constructed in accordance with my invention never deteriorates during normal use and the machine parts with which it is associated may be assembled and disassembled many times without impairing the effectiveness of the seal.

It is to be understood that even though the juxtaposed faces of the machine parts are brought into engagement with one another as shown in Fig. 2 to form a continuous uninterrupted passage through which fluid may smoothly flow, there will always be a certain amount of seepage or leakage of fluid from such passage into the annular groove 6. Such leakage is, of course, stopped by the seal 7 which is disposed in the groove and is so minute that in effect the engaged juxtaposed faces of the machine parts define a pressure snubbing or dampening passage to offer high resistance to the transmission of pressure pulsations and surges from the fluid passage into the groove 6. While the seriousness of such pulsation, for example, is not ordinarily appreciated because it only shows up in a pressure gauge as a minute vibration of the needle thereof, there is a very destructive action produced by such puslation, which, without adequate protection thereagainst, will quickly damage delicate instruments and the like in the system. Such pulsation is present in most dynamic fluid pressure systems and attains peak pressure many times that of the predominant pressure indicated by the pressure gauge needle. In the present case, the aforesaid dampening passage is so small that any pressure pulsation or surge in the main fluid passage is effectively snubbed so as not to be transmitted into the groove 6. In this way the seal 7 is effectively protected against the otherwise destructive action of such pressure fluctuation to thus greatly enhance the life of the seal.

Other modes of applying the principle of the invention may be employed, change being made as regards the details described, provided the features stated in any of the following claims or the equivalent of such be employed.

I therefore particularly point out and distinctly claim as my invention:

1. The combination with separable machine parts having annular juxtaposed faces, of a metallic sealing ring of S-shaped cross section axially flexed with the large and small diameter axially remote portions thereof respectively in yieldable sealing engagement with such faces, and a non-metallic sealing ring about said metallic ring in sealing engagement with the latter and with the part engaged by such large diameter axially remote portion of said metallic ring.

2. The combination with separable machine parts having annular juxtaposed faces forming an annular chamber therebetween which includes axially spaced end faces and radially spaced inner and outer faces, of a metallic sealing ring of S-shaped cross section in such chamber axially flexed between such end faces with the axially remote portions thereof in yieldable sealing engagement with such end faces, and a ring of cementitious material encircling said sealing ring and adhered to the latter and to one of said parts for axially retaining said sealing ring on said one of said parts when said parts are separated.

JAMES P. JOHNSON.

REFERENCES CITED

The following references are of record in the file of this patent:

UNITED STATES PATENTS

| Number | Name | Date |
|---|---|---|
| 294,562 | Baldwin | Mar. 4, 1884 |
| 1,882,223 | Lorehn | Oct. 11, 1932 |

FOREIGN PATENTS

| Number | Country | Date |
|---|---|---|
| 518,460 | Great Britain | Feb. 27, 1940 |